United States Patent [19]

Shelby et al.

[11] 4,433,367

[45] Feb. 21, 1984

[54] LUMINAIRE MOUNTING STRUCTURE

[75] Inventors: Billy L. Shelby, Memphis; Giovanni DeCandia, Germantown, both of Tenn.

[73] Assignee: International Telephone and Telegraph Corporation, New York, N.Y.

[21] Appl. No.: 467,749

[22] Filed: Feb. 18, 1983

[51] Int. Cl.³ .............................................. B60Q 1/00

[52] U.S. Cl. .................................... 362/370; 362/368; 362/396; 362/431; 362/432

[58] Field of Search ............... 362/368, 370, 396, 431, 362/432

[56] References Cited

U.S. PATENT DOCUMENTS 4,319,313 3/1982 Eberhart et al. .................... 362/370

4,320,443 3/1982 Zwillich et al. .................... 362/370

*Primary Examiner*—Stephen J. Lechert, Jr.

*Attorney, Agent, or Firm*—James B. Raden; Marvin M. Chaban

[57] ABSTRACT

A mounting structure for an outdoor luminaire adapted to mount on a tubular mast. The structure has a discontinuous tubular bore comprised of two axially spaced apart semi circular sections forming the top of the bore and a bottom semi circular section spaced midway between the two upper sections. The bore structure is integral to the housing with the inner top section adjoining an enclosing face on the housing terminating said bore. One or more of said sections includes a central boss for receiving a set screw therein adapted to bear against the mast and prevent relative movement between the housing and mast.

9 Claims, 4 Drawing Figures

LUMINAIRE MOUNTING STRUCTURE

BACKGROUND OF THE INVENTION

In the field of outdoor lighting, one conventional approach to mounting a luminaire on a pole or building is to secure the housing on a generally horizontal cylindrical or tubular mast. The mast may fit into a sleeve or partial sleeve integral to the housing and be clamped to the housing by one or more clamps or U bolts bolted to the sleeve. For example, see U.S. Pat. No. 2,908,809 issued Oct. 13, 1959 to Beach et al. Another approach is to provide a frame or sleeve into which the mounting mast fits and using bolts or set screws to impinge against the mast and allow adjustment of the luminaire inclination. See U.S. Pat. No. 3,032,648 to Pfaff issued May 1, 1962.

The providing of external clamps or U bolts requires added parts and inventory. The partial sleeve of the mounting housing allows the housing to be cast or molded. With a full 360° sleeve, the mounting section cannot be cast or molded integrally with the housing and must also be an add-on part as shown by the '648 patent.

SUMMARY OF THE INVENTION

The present invention provides a luminaire with a mounting sleeve integral to the housing, the mounting sleeve configured to allow casting or molding of the housing.

The housing disclosed is of the type used for lighting an area of a yard or the entry area of a house to deter break-ins. The mounting sleeve of the luminaire is integral to the housing and the entire housing and sleeve may be molded of suitable plastic or die cast of metal such as aluminum.

With either material, the mounting sleeve is fabricated integrally as part of the housing. The mounting sleeve comprises a discontinuous tubular bore leading to a slotted closure wall at the entry to the housing. The slot provides entry for the electrical wires while the closure is required to meet safety regulations.

The mounting sleeve or body includes a first and a second upper semi circular section, the sections being spaced apart by an axial air space. The first semi circular section is adjacent to and integrally connected to the bore closure wall. This section covers the upper 180° of the bore and extends downwardly for a distance beyond the horizontal. Spaced axially from the first section is the second upper section of like extent. In the space between the upper sections, a single lower semi circular section completes the bore. The lower section is integrally formed with the upper sections and is opposite the air space which separates the first and second upper sections.

In this way there are formed discrete semi circular sections on alternate diametral sides of the horizontal to complete a discontinuous bore for a mounting mast. One or all of the sections may have a centrally located reinforced boss with an opening therein for receiving a set screw to bear against a mast held in the sleeve bore. Each section encompasses approximately 180° of arc and each has an equal sized air gap diametrically opposite.

It is therefore an object of the invention to provide an outdoor luminaire housing with integral mounting sleeve adapted to receive a mounting mast. The mounting sleeve is discontinuous with its bore diameter large enough to receive the mast in a tight fitting relation.

DETAILED DESCRIPTION

Figure 1:
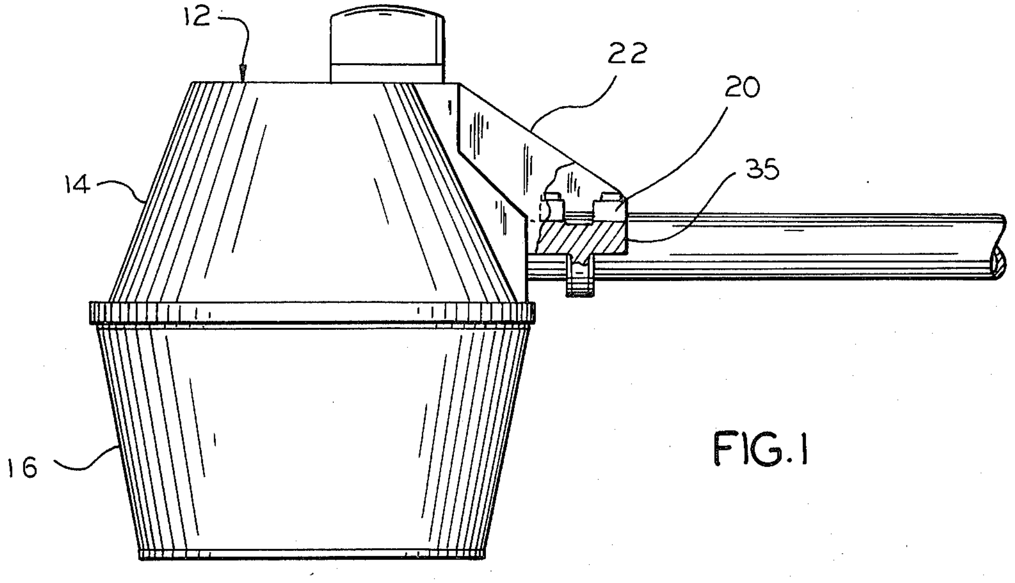
FIG. 1 is a side view in elevation of an outdoor luminaire mounted on a tubular mast, the luminaire using the present invention.

The luminaire or outdoor lighting fixture 12 shown in FIG. 1 is of a type commonly used for security lighting of residences, and is frequently called a yard light. In such a luminaire, the main housing 14 is essentially a one piece or two piece frusto conic shell, molded or cast, which houses the lamp and other components (not shown). A frusto conic glass or plastic lens 16 is mounted on the housing and completes the structure. The lens or refractor 16 may be open at the bottom to transmit light from the vertically downwardly facing lamp primarily to the area below. Such luminaires are very well known in the art and produced by many manufacturers.

With such luminaires, the housing is generally cast or molded as a unitary part of aluminum or suitable engineering grade plastic with an integral mounting channel or slipfitter mounting extending from the housing. The ends of the channel in the known art design are reinforced and frequently have threaded openings to receive a bolt at each side of the channel for clamping a clamp bracket to the underside of the mast arm to which the luminaire is secured.

As shown in FIG. 1, the luminaire mast mounting structure 20 extends from the housing and includes reinforcing webs 22 extending from the housing to the outer end of the mounting structure outwardly of each side of the mounting area.

Figure 2:
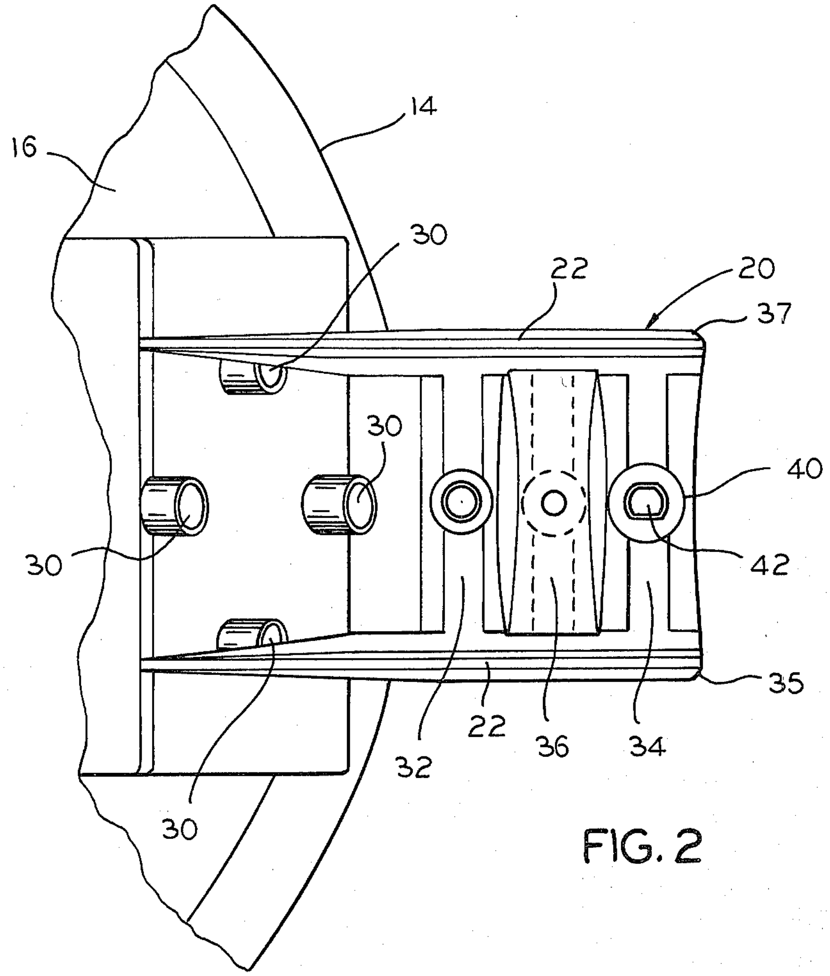
FIG. 2 is a plan view of the mast mounting area of the luminaire of FIG. 1 with the mast removed.
Figure 4:
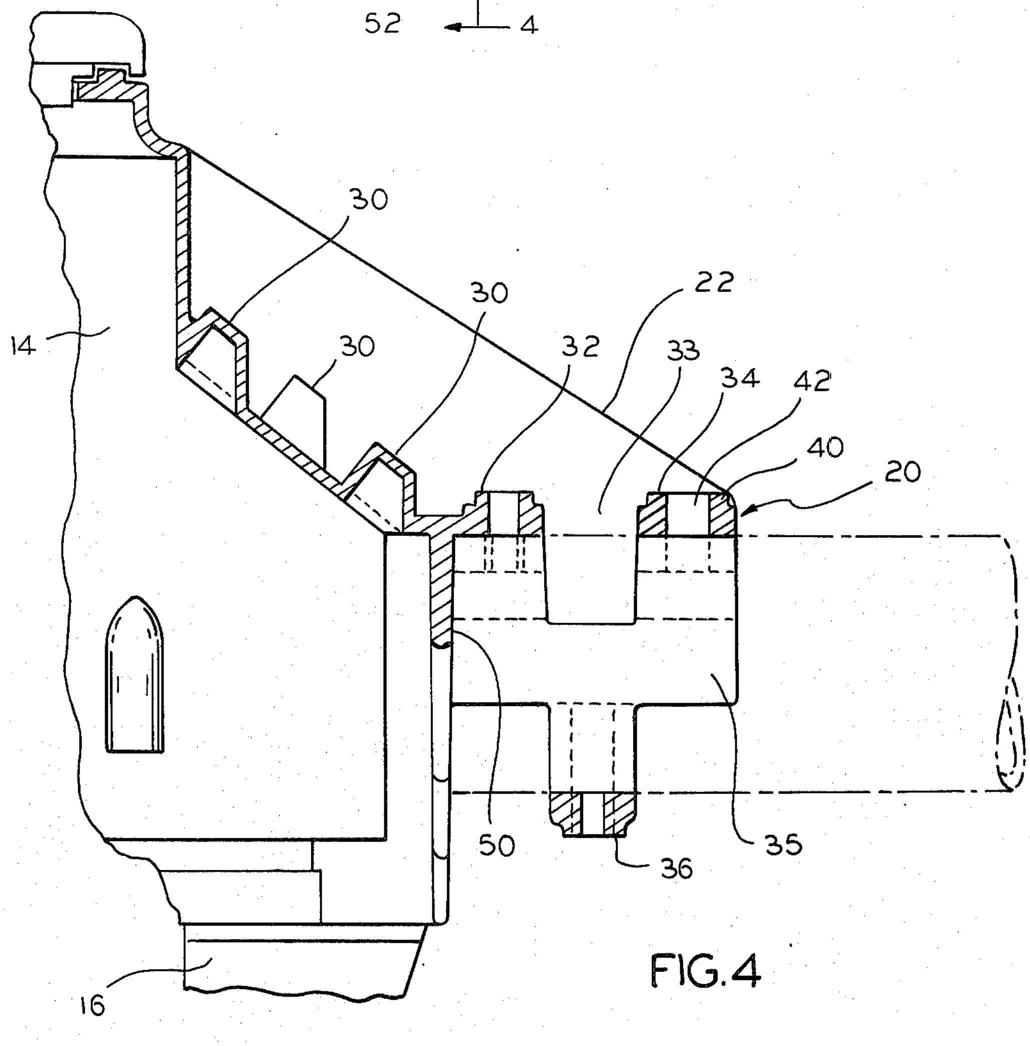
FIG. 4 is a sectional view taken along lines 4—4 of FIG. 3.

The mounting area is best shown in FIGS. 2 and 4. In these views, there can be seen the reinforcing webs 22 on both sides of and framing the mounting area. Also seen in these views are the embosses 30 used for mounting the socket (not shown) and other interior components as necessary.

The mounting area comprises a discontinuous sleeve composed of two axially spaced apart upper semi-circular clevis members 32 and 34, and a lower clevis member 36 intermediate between the upper clevis members. Horizontal rails 35 and 37 extending the length of the sleeve on each side of the sleeve join the clevis members which may also be called semi-circular sections or clevises. The horizontal rails maintain the structural integrity of the mounting area. These rails extend a distance above and below the horizontal plane through the bore axis.

The innermost clevis 32 is integrally affixed to the housing for its full extent of almost 180° of angular extent. At its diametral ends clevis 32 is integrally connected to both side rails 35 and 37. Spaced axially from clevis 32 by an air space 33 is the second upper clevis 34 which is coextensive with the inner clevis 32. Clevis 34 is also connected integrally at its diametral ends to the rails 35 and 37. Each clevis has diametrally opposite an air space with an area at least equal to that of the clevis.

For each clevis and air space, the term area as used herein means the area of projection on a horizontal plane parallel to the axis of the mounting bore.

Intermediate between the upper clevis members 32 and 34 and axially opposite the air space 33 is a single lower, semi-circular clevis 36 which also encompasses almost 180° of axial extent. At its axial ends, the lower clevis 36 is inherently connected to the rails to the upper clevises and diametrally the lower clevis 36 is inherently connected to the webs at both diametral sides.

The upper and lower clevises form a discontinuous sleeve or bore of circular cross section. Each clevis member extends almost 180° of angular extent and opposed to each clevis member is an air space. Two such upper clevises are provided with a lower clevis axially positioned between the upper clevises. By providing clevises covering almost 180° of angular extent with an air space covering the remaining 180°, the luminaire housing may be molded or cast as a single integral unit and be readily removed from the mold or casting.

At the center of each clevis, there is a circular emboss 40 with a central opening 42. The opening may be threaded to receive a screw or may be retained as a bore extending to the discontinuous mast bore to receive a self tapping screw or bolt as a set screw (not shown). A set screw may be mounted in each embossed opening, or one may be mounted in only the lower clevis or in any combination of clevises to hold the luminaire discontinuous bore on the mast and against rotation or axial movement.

The discontinuous bore is preferrably slightly larger in circumference than the circumference of the mast which fits into the bore so that the mast rests in the bore with little clearance.

Figure 3:
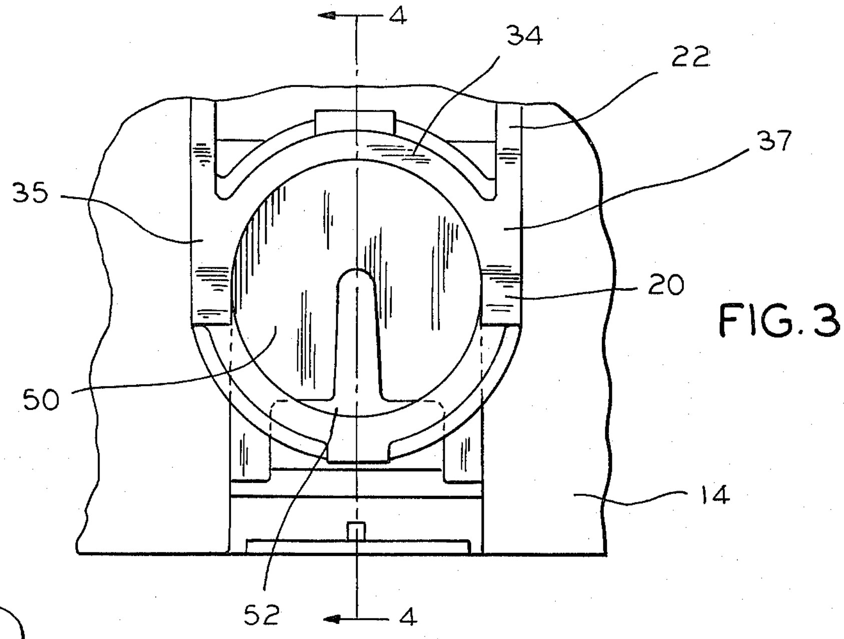
FIG. 3 is a side view in elevation of the mounting area of FIG. 2.

As viewed in FIG. 3, the discontinuous mounting bore is inherently connected to the housing along the 180° of arc encompassed by the inner clevis 32 (as seen best in FIG. 4). The luminaire is set on the mast and the discontinuous bore is advanced onto the mast until the mast end strikes the housing terminal enclosure 50 which covers most of the bore area. The enclosure 50 is integral with said housing and is joined to the inner clevis 32 (as seen best in FIG. 3) to form a nest for receiving and holding the end of the mast. An inverted T shaped opening 52 in the lower portion of enclosure 50 provides entry for the power leads into the housing cavity. With the opening in the lower portion of the enclosure, the nesting area for the end of the mast is a semi-circular ridge formed between the inner clevis 32 and the top of the enclosure 50.

The lower clevis is spaced a distance from the terminal enclosure, the distance being at least one inch, to firmly hold the mast within the bore preferably with one or more set screws. The outer upper clevis 34 is spaced from the innermost clevis 32 to provide two spaced apart members for preventing drooping of the mast free end. The preferred approach is to use a set screw in each upper clevis, or in the lower clevis.

A number of variations on the general principle shown may be employed. For example, the bore of the mounting structure formed by the clevis members could be slightly smaller than the circumference of the mast with the mast having an axially elongate split or slit to enable press fitting of the mast into the bore of mounting structure. The mast in this case would compress as it enters the bore of the mounting structure to enable a tight fit of mast in housing mounting. With cooperative structure of this type, the mast could be provided with a keyway or slot along the mast split to mate with one or more inwardly extending embosses of the bore clevis members to prevent rotation of the housing about the mast axis.

A further variation could be to configure the mast tube into a multi-sided polygon such as one of hexagonal cross-section. Thus, the mast tube would be uniform in cross-section with the polygonal cross-section, i.e., square, rectangular, hexagonal, trapezoidal or the like. The clevis members could be configured of a like cross-section to receive the mast tube tightly. The mating edges of the polygon within like shaped clevis members would coact with the mounting to prevent rotation of the housing relative to the mast without the need for screws.

By use of the structure shown, an inexpensive one-piece mounting structure which may be integral with the luminaire housing may be provided.

What is claimed is:

1. Mounting structure for affixing the housing of an outdoor luminaire on a substantially horizontal, generally cylindrical mast, said structure including a discontinuous tubular body integrally secured to said housing and forming a bore adapted to receive the mast therein, an end face of said luminaire forming the inner end of said bore to butt against the end of the mast, said body comprising a first semi circular section integrally connected to said end face, a second semi circular section spaced axially from the first section with an air space separating said two sections axially, and with said sections aligned to enclose a like portion of the mast, and a single semi circular section diametrally aligned with the air space intermediately between said first and second sections with the single section joined to the first and second sections at the axial ends of the single section, and a reinforcing boss at the center of the single section adapted to receive a set screw therein to bear against the mast to support said housing on said mast.

2. Mounting structure as claimed in claim 1, in which the first and second sections enclose the upper portion of the mast and the single section encloses a lower portion of the mast.

3. Mounting structure as claimed in claim 2, in which the joining of the first and second sections to the single section comprises diametrally opposed strips of limited circumferential extent continuing for the axial length of the sleeve.

4. Structure for mounting an outdoor luminaire on a generally horizontal tubular mast with said structure integrally connected to the housing of said luminaire, said structure comprising a discontinuous sleeve for said mast, said sleeve comprising a first, a second and a third clevis joined together along horizontal rails diametrally opposed adjacent the horizontal plane through the axis of the bore, said first and third clevises being axially spaced apart with both encompassing approximately 180° of arc comprising the top of the bore and the second clevis axially intermediate the first and third clevises and encompassing the bottom of the bore, each, all said clevises and said rails being integrally connected to said housing with each clevis having opposite it diametrally an air space whose axial length is essentially the length of the respective clevis opposite thereto.

5. Structure as claimed in claim 4, in which at least one of said clevises has a central embossed area with a through opening communicating with the bore.

6. Structure as claimed in claim 5, in which there is a reinforcing web at each side of said bore integrally connecting said rails to the housing.

7. Mounting structure for affixing the housing of an outdoor luminaire onto a horizontal, tubular mast, said mounting structure being integral to said housing and extending laterally therefrom, and in which said housing bears therein lighting components in the interior thereof, said mounting structure including a discontinuous mounting tube of slightly greater bore than the exterior of said mast to enable axially slidable entry of the mast, into said tube said mounting structure including a terminal enclosure wall generally closing entry from the mounting bore to the interior of said housing, first and second axially spaced clevis members forming the upper portion of the mounting tube, and a further clevis member forming the bottom of said mounting tube and axially spaced between said first and second clevis members, said first clevis member and said terminal enclosure wall joined to form a nest for receiving and holding the end of said mast, and horizontally elongated rails on both sides of the tube bore for joining said clevis members.

8. Mounting structure as claimed in claim 7, in which there is a ridge formed between said first clevis and said enclosure to comprise said nest.

9. Mounting structure as claimed in claim 7, in which said mast is of multi-side construction and the bore of said mounting structure has a cross-section shaped to receive said mast.

* * * * *